US012608885B1

(12) United States Patent
Foster

(10) Patent No.: US 12,608,885 B1
(45) Date of Patent: Apr. 21, 2026

(54) PROCESSING SENSOR DATA FOR NEURAL NETWORKS

(71) Applicant: GM Cruise Holdings LLC, San Francisco, CA (US)

(72) Inventor: Paul Carrington Foster, Mountain View, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 173 days.

(21) Appl. No.: 18/468,643

(22) Filed: Sep. 15, 2023

(51) Int. Cl.
| | |
|---|---|
| *G06T 17/05* | (2011.01) |
| *B60W 60/00* | (2020.01) |
| *G06N 3/0455* | (2023.01) |
| *G06N 3/084* | (2023.01) |

(52) U.S. Cl.
CPC ........... *G06T 17/05* (2013.01); *G06N 3/0455* (2023.01); *G06N 3/084* (2013.01); *B60W 60/00* (2020.02); *B60W 2420/403* (2013.01)

(58) Field of Classification Search
CPC ...... G06T 17/05; G06N 3/0455; G06N 3/084; B60W 60/00; B60W 2420/403; G01S 13/865; G01S 13/867; G01S 7/417; G06V 20/588
See application file for complete search history.

(56) References Cited

U.S. PATENT DOCUMENTS

| | | | |
|---|---|---|---|
| 2022/0083792 A1* | 3/2022 | Naseer ................. | G06V 20/582 |
| 2024/0400079 A1* | 12/2024 | Priyadarshi ............... | G06T 7/97 |
| 2025/0085413 A1* | 3/2025 | Yogamani ............ | G01S 13/867 |

* cited by examiner

*Primary Examiner* — Robin J Mishler
(74) *Attorney, Agent, or Firm* — CANTOR COLBURN LLP

(57) ABSTRACT

Systems and techniques are disclosed for processing sensor data using neural networks. An example method can include receiving, via a first sensor, a first set of sensor data, wherein the first set of sensor data represents an environment; receiving, via a second sensor, a second set of sensor data, wherein the second set of sensor data represents the environment; generating one or more multi-view projection (MVP) tokens based on a combination of the first set of sensor data and the second set of sensor data, wherein each MVP token of the one or more MVP tokens includes a representation of the first set of sensor data projected into space and/or the second set of sensor data projected into space; and processing, via a neural network with an attention mechanism, the one or more MVP tokens.

20 Claims, 6 Drawing Sheets

300

Receive, Via A First Sensor, A First Set Of Sensor Data
510

Receive, Via A Second Sensor, A Second Set Of Sensor Data
520

Generate One Or More Multi-View Projection (MVP) Tokens Based On A Combination Of The First Set Of Sensor Data And The Second Set Of Sensor Data
530

Process, Via A Neural Network With An Attention Mechanism, The One Or More MVP Tokens
540

PROCESSING SENSOR DATA FOR NEURAL NETWORKS

BACKGROUND

1. Technical Field

The present disclosure generally relates to processing sensor data for neural networks. For example, aspects of the present disclosure relate to techniques and systems for improving the efficiency and latency of processing sensor data by neural networks.

2. Introduction

Sensors are commonly integrated into a wide array of systems and electronic devices such as, for example, camera systems, mobile phones, autonomous systems (e.g., autonomous vehicles, unmanned aerial vehicles or drones, autonomous robots, etc.), computers, smart wearables, and many other devices. The sensors allow the devices to obtain sensor data that measures, describes, and/or depicts one or more aspects of an event, condition, and/or target such as an object, a scene, a surface, and/or a person, among others. For example, an image sensor of a camera device can be used to capture frames (e.g., video frames and/or still pictures/images) depicting a target(s) from any electronic device equipped with an image sensor. As another example, a light ranging and detection (LiDAR) sensor can be used to determine ranges (variable distance) of one or more targets by directing a laser to a surface of an entity (e.g., a person, an object, a structure, an animal, etc.) and measuring the time for light reflected from the surface to return to the LiDAR. The sensor data can be processed by one or more algorithms to derive an output such as, for example, a prediction or estimate, a decision, a content item, a plan, an instruction, etc.

BRIEF DESCRIPTION OF THE DRAWINGS

Illustrative embodiments of the present application are described in detail below with reference to the following figures.

DETAILED DESCRIPTION

Figure 1:
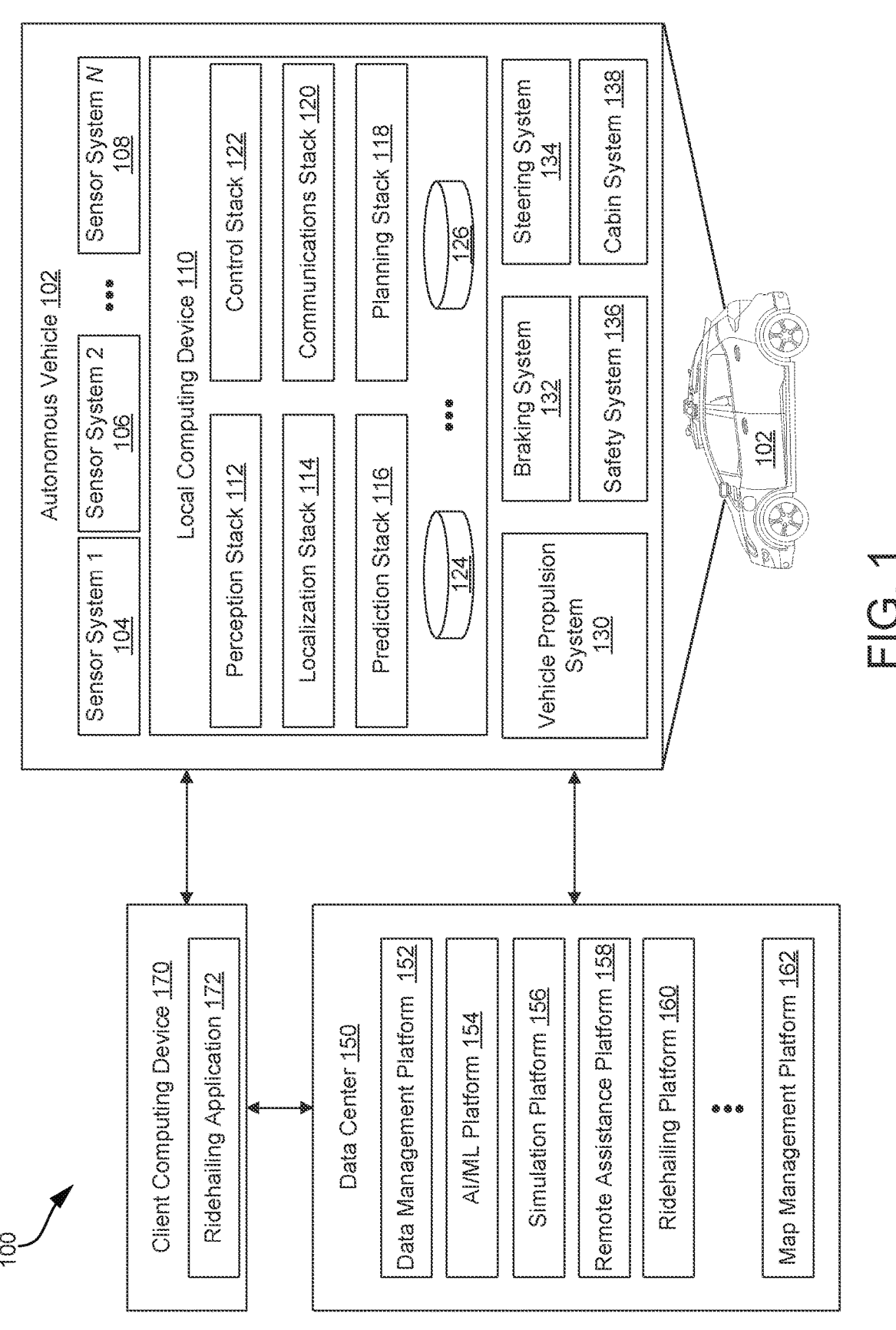
FIG. 1 illustrates an example system environment that can be used to facilitate autonomous vehicle (AV) navigation and routing operations, according to some examples of the present disclosure.

The detailed description set forth below is intended as a description of various configurations of the subject technol-ogy and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Sensors are commonly integrated into a wide array of systems and electronic devices such as, for example, camera systems, mobile phones, autonomous systems (e.g., autonomous vehicles, unmanned aerial vehicles or drones, autonomous robots, etc.), computers, smart wearables, and many other devices. The sensors allow the devices to obtain sensor data that measures, describes, and/or depicts one or more aspects of an event, condition, and/or target such as an object, a scene, a surface, and/or a person, among others. For example, an image sensor of a camera device can be used to capture frames (e.g., video frames and/or still pictures/images) depicting a target(s) from any electronic device equipped with an image sensor. As another example, a light ranging and detection (LiDAR) sensor can be used to determine ranges (variable distance) of one or more targets by directing a laser to a surface of an entity (e.g., a person, an object, a structure, an animal, etc.) and measuring the time for light reflected from the surface to return to the LiDAR. The sensor data can be processed by one or more algorithms to derive an output such as, for example, a prediction or estimate, a decision, a content item, a plan, an instruction, etc. Moreover, the sensor data can be used in a variety of use cases and applications, such as automation, robotics, smart devices, Internet-of-Things (IOT) devices, and camera systems, among others. One example use case for sensor data and algorithms for processing sensor data, such as machine learning models, is autonomous vehicles.

Autonomous vehicles (AVs), also known as self-driving cars, driverless vehicles, and robotic vehicles, are vehicles that use sensors to sense the environment and navigate the environment without human input (or with minimal human input). Automation technologies enable AVs to drive on roadways and perceive the surrounding environment accurately and quickly, including obstacles, signs, road users and vehicles, traffic lights, semantic elements, boundaries, among others. In some cases, AVs can be used to pick-up passengers and/or cargo and drive the passengers and/or cargo to selected destinations.

An AV can include various types of sensors such as, for example and without limitation, a camera sensor, a light detection and ranging (LiDAR) sensor, a radio detection and ranging (RADAR) sensor, an acoustic sensor (e.g., an ultrasonic sensor, a microphone, etc.), an inertial measurement unit (IMU), among others. The AV can use such sensors to collect data and measurements in a driving environment, which the AV can use to perform AV operations such as navigation. The sensors can provide the data and measurements to an internal computing system of the AV that can use the data and measurements to control a mechanical system of the AV, such as a vehicle propulsion system, a braking system, or a steering system.

As discussed above, AVs can employ a combination of sensors including, but not limited to, LiDAR sensors, RADAR sensor, and camera sensors to help the AVs navigate and interact with their surrounding environment (e.g., real-world environment). By way of example, a LiDAR sensor can use pulsed laser light to create a detailed three-dimensional (3D) map (e.g., a point cloud) of the vehicle's surroundings, which the AV can use to detect and avoid obstacles and understand (e.g., via the perception layer) the environment of the AV. A RADAR sensor can utilize radio waves to measure the distance, angle, and velocity of surrounding objects. In some cases, a RADAR sensor may assist the AV under conditions of poor visibility such as fog, rain, or darkness where other sensors like cameras and LiDAR might be less effective. An AV may use camera sensors to capture visual data (e.g., in the form of RGB image frames and/or video frames) for object detection and recognition, lane tracking, and traffic sign interpretation, among other things.

In some examples, neural networks can be implemented to process sensor data, such as data from a LiDAR, RADAR, and/or camera. For example, an AV may include one or more neural networks that can process and interpret the sensor data to understand and interact with the environment, enabling tasks such as, without limitation, object detection, classification, planning, navigation, tracking and trajectory prediction. Neural networks can utilize sensor data to make driving decisions such as when to accelerate, brake, turn, or navigate through traffic. In some aspects, the various sensor sources (e.g., cameras, LiDAR, RADAR, etc.) may provide a different perspective on the AV's surroundings (e.g., driving environment). For example, cameras can capture visual data that neural networks (e.g., Convolutional Neural Networks (CNNs), transformers, etc.) may process to perform one or more tasks such as, without limitation, detecting and classifying objects, recognizing objects and scene elements (e.g., lane markings, traffic signals, road features, obstacles, etc.), and interpret traffic signs.

LiDAR sensors may generate a point cloud, such as a three-dimensional (3D) point cloud, of the AV's environment and generate data which may be transformed and interpreted by one or more neural networks for one or more tasks such as, for example and without limitation, object detection, classification, planning, navigation and routing, recognition, prediction, tracking and motion estimation. Similarly, RADAR data may be leveraged by neural networks to ascertain object distances and velocities. By processing and combining different sensor inputs, neural networks can help AVs understand their environment, predict the behavior of other road users, and make accurate and efficient driving decisions, for example.

In some cases, one or more neural networks can process sensor data through interconnected layers where each layer can perform a specific transformation or computation on the data. For example, when data enters the neural network (e.g., an image from a camera, a point cloud from a LiDAR, or a signal from a RADAR), the data may first be processed by an input layer of the neural network. In some instances, different preprocessing steps/tasks may be performed on different types of sensor data before such sensor data is fed into the neural network. By way of example, images may be resized and normalized before they are fed into a neural network, while LiDAR data may be converted into a grid or voxel format before it is fed into the neural network. The input data may then be propagated through the hidden layers of the neural network. In each layer of the neural network, the data can be transformed by a set of weights, biases, and activation functions. The weights and biases can include learned parameters, optimized during the training phase to minimize the discrepancy between the neural network's predictions and the actual (e.g., ground truth) data. Activation functions may introduce non-linearities into the model (e.g., the neural network model), enabling the model to learn complex patterns and relationships in the data.

In a CNN, which can accurately and effectively process image data, the layers may include one or more convolutional layers, pooling layers, and fully connected layers. In some aspects, convolutional layers can apply a set of learnable filters to the input, pooling layers may reduce the spatial dimensions while retaining important information, and fully connected layers can combine features to make final predictions. For example, with LiDAR data, three-dimensional CNNs or architectures can be used which are capable of processing point cloud data. The output layer of the neural network may then produce the final predictions or decisions, such as the classes and locations of detected objects (e.g., people, object types on the road where the AV is navigating), the estimated trajectory of the AV, or the appropriate driving action to take.

In some aspects, some neural network architectures, such as transformer neural network architectures (e.g., used in natural language processing (NLP) tasks and computer vision), may specialize in understanding relationships in data. In a traditional neural network, the data may be processed in order (e.g., as the neural network receives the data via the input layer) while in other neural networks such as transformer networks, the neural network may pay attention to all or various parts of the data simultaneously. Some neural networks such as transformers may include one or more attention mechanisms that may determine how much influence different parts or pieces of the data should have on each other, which may enable such neural networks to handle long-range dependencies and contextual relationships. In some examples, the structure of an attention-based neural network such as a transformer may process data in parallel, which may improve (e.g., compared to other neural networks) the efficiency and performance for tasks including, but not limited to, tasks involving sequences of text, time-series data, and sensor data for AVs. Examples of neural network types in addition to transformers that may include attention mechanisms may include, but are not limited to, recurrent neural networks (RNNs), CNNs, graph neural networks (GNNs), and long short-term memory networks (LSTMs).

In some cases, data from one or more sensors (e.g., LiDAR, camera, RADAR) may be converted into tokens, where a token may represent a single measurement or a group of measurements. For example, a set of tokens may include values representing, encoding, and/or corresponding to certain sensor data such as, for example, points in a LiDAR point cloud, RADAR returns, and/or pixels in a camera image. The attention mechanism may determine the importance or relevance of different tokens when making a prediction, calculation, and/or decision. By way of example, for each token being processed by an attention-based neural network, the attention mechanism may calculate a set of attention weights that may represent how much each other token (e.g., in the input of the attention mechanism) may influence the processing of the current token (e.g., the token being processed). In some aspects, the weighting of the tokens may enable a neural network (e.g., and/or an AV implementing the neural network) to focus on the most relevant tokens for a particular use case or scenario (e.g., if an AV is making a left turn, the attention mechanism may apply a higher weight to tokens corresponding to sensor data to the left of the AV). The transformer (e.g., or any other type of neural network with an attention mechanism) may dynamically adjust the attention weights to prioritize relevant information (e.g., for a use case or scenario) and ignore irrelevant information which may improve the AV's ability to make accurate decisions.

In some cases, processing tokens by an attention-based neural network may be computationally expensive in part as a result of the attention mechanism. For example, the computational cost of a transformer in terms of computation resources and memory may be at least in part due to the attention mechanism which may scale quadratically with the sequence length associated with one or more tokens being processed. In other words, for each token in the sequence, the transformer may compute attention weights with respect to other tokens (or all tokens) in the sequence. As a result, the greater the number of tokens that are considered by the attention mechanism, the more computations that may be needed. In some cases, an attention-based neural network such as a transformer may use multiple heads for the attention mechanism, which may allow the neural network to focus on different types of relationships in the data and each additional head may increase the computational cost.

Described herein are systems, apparatuses, processes (also referred to as methods), and computer-readable media (collectively referred to as "systems and techniques") for improving the efficiency and latency of processing sensor data by neural networks, such as attention-based neural networks. In some cases, to reduce the computational cost for an attention-based neural network (e.g., a transformer, etc.) in processing tokens, the systems and techniques described herein can reduce the number of tokens considered by an attention mechanism of a neural network.

For example, in a scenario where an AV is autonomously navigating a real-world environment and utilizing one or more sensors such as a camera, LiDAR, and RADAR sensor to perceive the environment, each AV sensor may provide different types of information or data pertaining to the environment. The camera sensor may capture images, the LiDAR sensor may provide a three-dimensional representation of objects (e.g., point cloud data), and the RADAR sensor may provide data for various objects' distance and relative speed (e.g., with respect to the AV). The sensor data for the LiDAR, camera, and RADAR sensors may be converted into tokens for processing by an attention-based neural network such as a transformer. In some instances, multi-view projection may be used to combine sensor data from different sources (e.g., LiDAR, camera, RADAR) into a unified three-dimensional representation of the environment (and/or a unified three-dimensional representation of a region of space) before converting the data into tokens (e.g., to be processed by the attention mechanism of a transformer). For example, multi view projection may be used to project sensor data from different sources into one or more regions of space, and fuse the projected sensor data from the different sources into a unified three-dimensional representation of region of space. The fused data can be converted into tokens to be processed by the attention mechanism of a neural network.

In some aspects, the number of tokens generated using multi-view projection and processed by an attention-based neural network may be fewer than the number of tokens generated and processed by the neural network without the use of multi-view projection. To illustrate, in the example of processing the AV sensor data independently, each sensor's data may be tokenized separately, which may lead to redundant tokens corresponding to data measuring, depicting, describing, and/or representing different and/or unrelated objects, features, and/or regions in space. In the example of multi-view projection, the systems and techniques described herein can generate tokes that include, embed, represent, and/or encode a unified representation of sensor data measuring, depicting, describing, and/or representing the same and/or related objects, features, and/or regions in space, and exclude and/or avoid generating (and processing) tokens corresponding to other less relevant and/or related data, resulting in fewer tokens being generated and processed and consequently less computations and computational cost of the neural network used to process such data.

Examples of the systems and techniques described herein are illustrated in FIG. 1 through FIG. 6 and described below. While the systems and techniques are described below in the context of neural networks and sensor data implemented by autonomous vehicles, the systems and techniques described herein can be implemented in any other context (e.g., use case, application, scenario, purpose, etc.) such as, for example and without limitation, other automation contexts, camera systems, smart devices, Internet-of-Things (IOT) devices, transportation systems and/or platforms (e.g., aircrafts, drones, trains, submarines, boats, other vehicles, elevators, etc.), extended reality systems (e.g., virtual reality systems, augmented reality systems, video-passthrough systems, mixed reality systems, etc.), and/or robotics, among others. The autonomous vehicle context for implementing the systems and techniques described herein is merely one illustrative example context provided for explanation purposes.

FIG. 1 illustrates an example of an AV environment 100, according to some examples of the present disclosure. One of ordinary skill in the art will understand that, for the AV environment 100 and any system discussed in the present disclosure, there can be additional or fewer components in similar or alternative configurations. The illustrations and examples provided in the present disclosure are not limiting and provided for explanation purposes. Other examples may include different numbers and/or types of elements, but one of ordinary skill in the art will appreciate that such variations do not depart from the scope of the present disclosure.

In this example, the AV environment 100 includes an AV 102, a data center (also autonomous vehicle fleet management device, autonomous vehicle fleet management system, management system) 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise inertial measurement units (IMUs), cameras (e.g., still image cameras, video cameras, etc.), light sensors (e.g., LiDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LiDAR system, and the sensor system 108 can be a RADAR system. Other examples may include any other number and type of sensors.

The AV 102 can include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LiDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.).

The perception stack 112 can also identify environmental uncertainties, such as where to look for moving objects, flag areas that may be obscured or blocked from view, and so forth. In some embodiments, an output of the prediction stack 116 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The localization stack 114 can determine the AV's position and orientation (pose) using different methods from multiple systems (e.g., GPS, IMUs, cameras, LiDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LiDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan Wi-Fi network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), BLUETOOTH®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LiDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, a ridehailing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridehailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridehailing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridehailing platform 160 can interact with a customer of a ridesharing service via a ridehailing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart earpods, or other smart in-ear, on-ear, or over-ear device, etc.), gaming system, or other general purpose computing device for accessing the ridehailing application 172. The client computing device 170 can be a customer's mobile computing device or a computing device integrated with the AV 102 (e.g., the local computing device 110). The ridehailing platform 160 can receive requests to pick up or drop off from the ridehailing application 172 and dispatch the AV 102 for the trip.

Map management platform 162 can provide a set of tools for the manipulation and management of geographic and spatial (geospatial) and related attribute data. The data management platform 152 can receive LiDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridehailing platform 160 may incorporate the map viewing services into the client application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 6.

Figure 2:
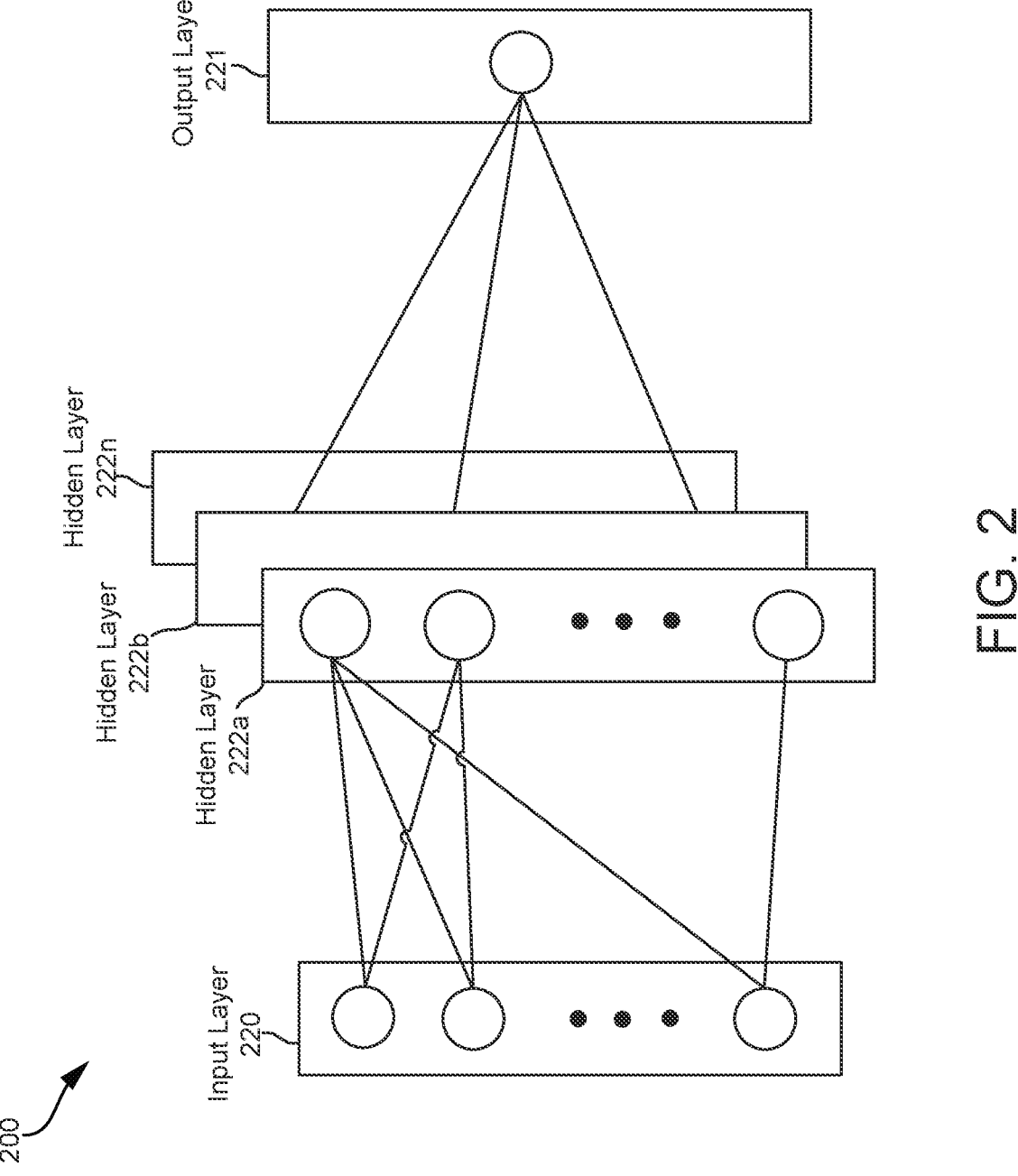
FIG. 2 illustrates an example of a deep learning neural network configured to receive sensor data, according to some examples of the disclosed technology.

In FIG. 2, the disclosure now turns to a further discussion of models that can be used by the systems and techniques described herein. FIG. 2 is a diagram illustrating an example of a neural network 200 that can be used to implement all or a portion of the systems and techniques described herein (e.g., neural network 200 can be used to implement a perception module (or perception system) as discussed above, and receive AV sensor data as described above for object detection and classification). In some examples, the neural network 200 can implement an attention mechanism, as further described herein.

An input layer 220 of the neural network 200 can be configured to receive sensor data and/or data relating to an environment surrounding a sensor used to capture the sensor data and/or an AV implementing the sensor. Neural network 200 includes multiple hidden layers 222a, 222b, through 222n. The hidden layers 222a, 222b, through 222n include "n" number of hidden layers, where "n" is an integer greater than or equal to one. The number of hidden layers can be made to include as many layers as needed for the given application. Neural network 200 further includes an output layer 221 that provides an output resulting from the processing performed by the hidden layers 222a, 222b, through 222n.

Neural network 200 is a multi-layer neural network of interconnected nodes. Each node can represent a piece of information. Information associated with the nodes is shared among the different layers and each layer retains information as information is processed. In some cases, the neural network 200 can include a feed-forward network, in which case there are no feedback connections where outputs of the network are fed back into itself. In some cases, the neural network 200 can include a recurrent neural network, which can have loops that allow information to be carried across nodes while reading in input.

Information can be exchanged between nodes through node-to-node interconnections between the various layers. Nodes of the input layer 220 can activate a set of nodes in the first hidden layer 222a. For example, as shown, each of the input nodes of the input layer 220 is connected to each of the nodes of the first hidden layer 222a. The nodes of the first hidden layer 222a can transform the information of each input node by applying activation functions to the input node information. The information derived from the transformation can then be passed to and can activate the nodes of the next hidden layer 222b, which can perform their own designated functions. Example functions include convolutional, up-sampling, data transformation, and/or any other suitable functions. The output of the hidden layer 222b can then activate nodes of the next hidden layer, and so on. The output of the last hidden layer 222n can activate one or more nodes of the output layer 221, at which an output is provided. In some cases, while nodes in the neural network 200 are shown as having multiple output lines, a node can have a single output and all lines shown as being output from a node represent the same output value.

In some cases, each node or interconnection between nodes can have a weight that is a set of parameters derived from the training of the neural network 200. Once the neural network 200 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 200 to be adaptive to inputs and able to learn as more and more data is processed.

The neural network 200 is pre-trained to process the features from the data in the input layer 220 using the different hidden layers 222a, 222b, through 222n in order to provide the output through the output layer 221.

In some cases, the neural network 200 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 200 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total=\Sigma(\frac{1}{2}$ (target-output)$^2$). The loss can be set to be equal to the value of E_total.

The loss (or error) will be high for the initial training data since the actual values will be much different than the predicted output. The goal of training is to minimize the amount of loss so that the predicted output is the same as the training output. The neural network 200 can perform a backward pass by determining which inputs (weights) most contributed to the loss of the network, and can adjust the weights so that the loss decreases and is eventually minimized.

The neural network 200 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 200 can include any other deep network, such as a transformer network, an autoencoder, Deep Belief Net (DBN), Recurrent Neural Network (RNN), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 3:
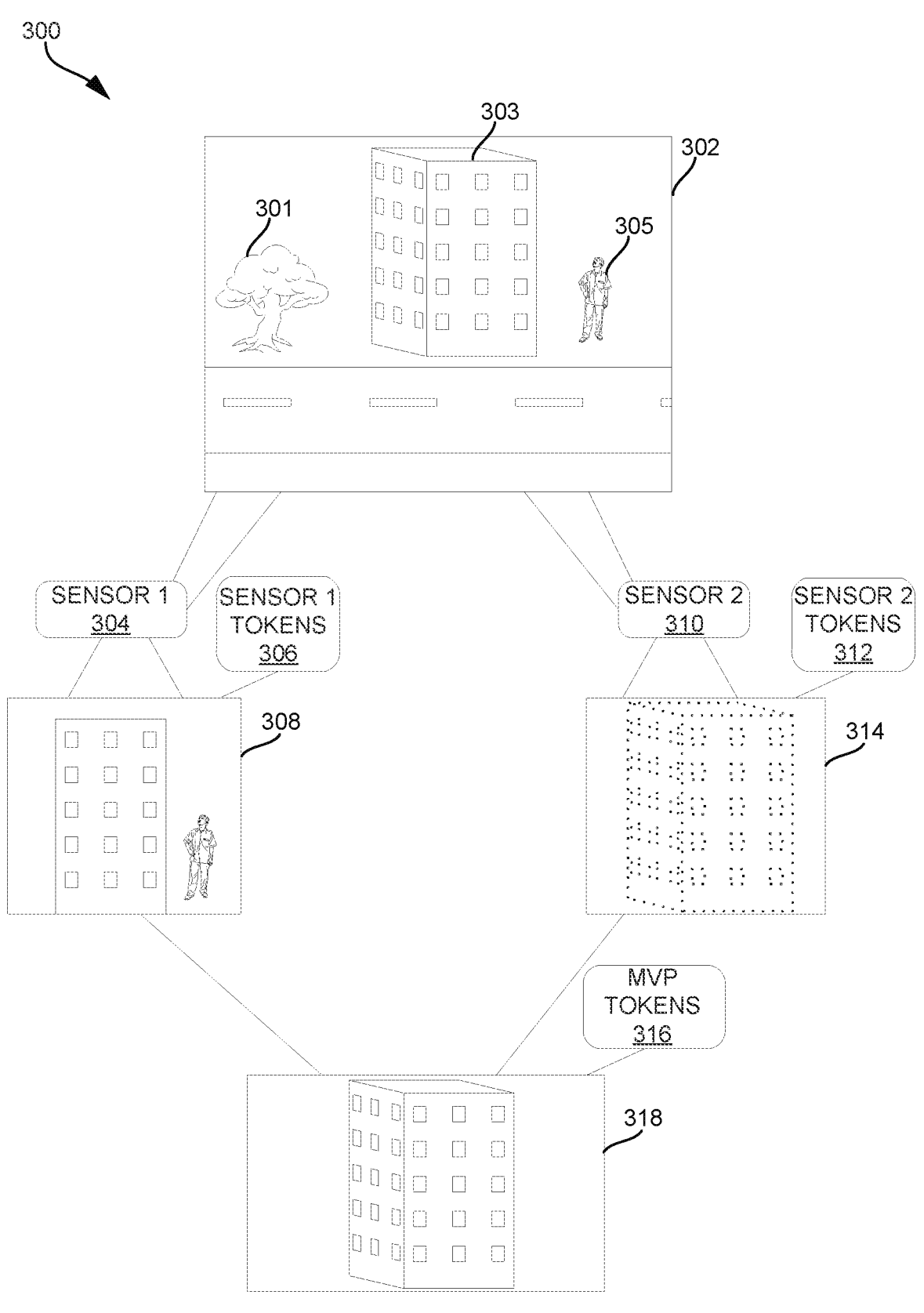
FIG. 3 illustrates an example of tokens generated for sensor data using multi-view projection of the sensor data, according to some examples of the present disclosure.

FIG. 3 illustrates an example environment 300 and tokens generated for sensor data from different sources (e.g., sensor systems 104-108 as illustrated in FIG. 1) using multi-view projection, according to some examples of the present disclosure. In this example, the environment 300 includes sensor 304 (e.g., a camera sensor) that may image an environment (e.g., where an AV is autonomously navigating) such as scene 302 as illustrated in FIG. 3, and sensor 310 (e.g., a LiDAR sensor) that may scan the environment. The sensor 304 in this example represents a camera sensor and the sensor 310 represents a LiDAR sensor. However, in other examples, the sensor 304 and/or the sensor 310 can include any other type of sensor such as, for example, a RADAR sensor, a time-of-flight (TOF) sensor, an ultrasonic sensor, among others.

The scene 302 in the example illustrated in FIG. 3 includes a tree 301, building 303, and person 305. By way of example, consider a scenario in which an AV with sensor 304 and sensor 310 is autonomously navigating an environment and capturing data corresponding to the scene 302. In this example scenario, the AV may be navigating towards building 303 and may utilize sensor 304 (e.g., a camera sensor) and sensor 310 (e.g., a LiDAR sensor) and a local computing device (e.g., local computing device 110) to detect and/or identify building 303 in scene 302. The sensor 304 (e.g., camera) may generate image data 308 and sensor 310 (e.g., LiDAR) may generate point cloud data 314 of building 303. In some cases, sensor 304 may generate data that does not correspond to building 303 and/or is less relevant for detecting building 303, such as pixel data for person 305 as illustrated by image data 308. The image data 308 generated by sensor 304 may depict building 303 and the point cloud data 314 may include a three-dimensional representation of building 303.

As discussed above, the AV may utilize (e.g., stored on local computing device 110) a neural network (e.g., a transformer, RNN, CNN, GNN, or LSTM) with an attention mechanism, where the attention mechanism may focus on and apply weights to different parts of the input to the attention mechanism. In an example scenario for detecting a building, the attention-based neural network may assign more attention to features that distinguish building 303 from other objects such as tree 301 and person 305. In some examples, the tokens 306 can represent sensor data captured by sensor 304 (e.g., camera) and projected to a region of space within the scene 300. The tokens 306 may include data representing and/or encoding color and intensity values in to image data 308. In some cases, tokens 306 generated from data captured by sensor 304 may include data corresponding to objects (e.g., building 303 and person 305) in image data 308. In some examples, the tokens 312 can represent sensor data captured by sensor 310 (e.g., LiDAR) and projected to a region of space within the scene 300. The tokens 312 can represent one or more points in a point cloud generated by sensor 310. In some cases, tokens 312 generated from data captured by sensor 310 may include point cloud data 314 for one or more objects (e.g., building 303 as illustrated in point cloud data 314). Those skilled in the art will appreciate how sensor data for various sensors (e.g., sensor systems 104-108 as illustrated in FIG. 1) may be stored as tokens.

In some cases, the attention mechanism for the transformer may process tokens 306 and tokens 312 independently, in sequence, or in parallel. For tokens 306, the attention mechanism may calculate a set of attention weights that may represent how much each other sensor token in the set of tokens 306 may influence the processing of a current sensor token from the tokens 306. Similarly, for tokens 312, the attention mechanism may calculate a set of attention weights that may represent how much each other sensor token in the set of tokens 312 may influence the processing of a current sensor token from the tokens 312. In some aspects, the weighting of tokens 306 and tokens 312 may enable the AV to focus on the most relevant tokens for a particular use case or scenario, such as detecting building 303.

In some aspects, multi-view projection may be used to project sensor data from sensor 304 and sensor data from sensor 310 into a region of space in the scene 300. The projected data from sensor 304 and sensor 310 can be combined into a representation of the sensor data from sensor 304 and sensor 310 to yield multi-view projection data 318 associated with sensor 304 and sensor 310, which can be used to generate one or more tokens. For example, in the scenario discussed above where an AV is navigating towards building 303, the multi-view projection data 318 may include and/or represent projected data from sensor 304, such as image data 308 or a portion thereof, and sensor 310 and projected data from sensor 310, such as point cloud data 314 or a portion thereof. As illustrated in FIG. 3, multi-view projection data 318 may include data corresponding to building 303 and may not include data corresponding to person 305 from the image data 308, in order to reduce the number of associated tokens by avoiding generating tokens for data corresponding to person 305, which pertains to a different region of space (and a different semantic element) as building 303.

For example, the projected data associated with sensor 304 and sensor 310 can be used to generate multi-view projection (MVP) tokens 316. To illustrate, in the scenario of detecting building 303, MVP tokens 316 may include a representation of at least a portion of image data 308 from sensor 304 (e.g., image data depicting building 303) and at least a portion of point cloud data 314 from sensor 310 (e.g., a location in three-dimensional space of building 303).

In some examples, while using multi-view projection, the number of MVP tokens 316 considered by the attention mechanism of an attention-based neural network may be less than the number of tokens considered by the attention mechanism for processing tokens generated for all the data from sensor 304 and sensor 310 without projecting the data into space to reduce the number of tokens processed to tokens pertaining to the same object and/or region of space (and, in some cases, one or more neighboring or adjacent regions of space). The fused representation or multi-view projection of data from sensor 304 and sensor 310 may leverage complementary data (e.g., overlapping data from image data 308 and point cloud data 314) and/or data corresponding to a same object and/or region of space, and/or may disregard less relevant or redundant data (e.g., in the example of detecting building 303, disregarding tokens corresponding to person 305 in image data 308), which may reduce the number of tokens considered by the attention mechanism of the attention-based neural network.

In some examples, the computation cost and/or amount of computational resources utilized by an attention-based neural network may be proportional to the number of tokens processed. For example, the attention mechanism of an attention-based neural network may scale quadratically with sequence length since for each token in the sequence the attention-based neural network may compute attention weights with respect to every other tokens in the sequence. The more tokens processed by a neural network, the more computations that may be utilized. Since the number of MVP tokens 316 may be less than the sum total of tokens 306 and tokens 312, the computational cost (e.g., the amount of computational resources utilized such as processing time, memory usage, energy consumption) may be less than processing the tokens 306 and tokens 312 individually (e.g., by not using multi-view projection).

Figure 4:
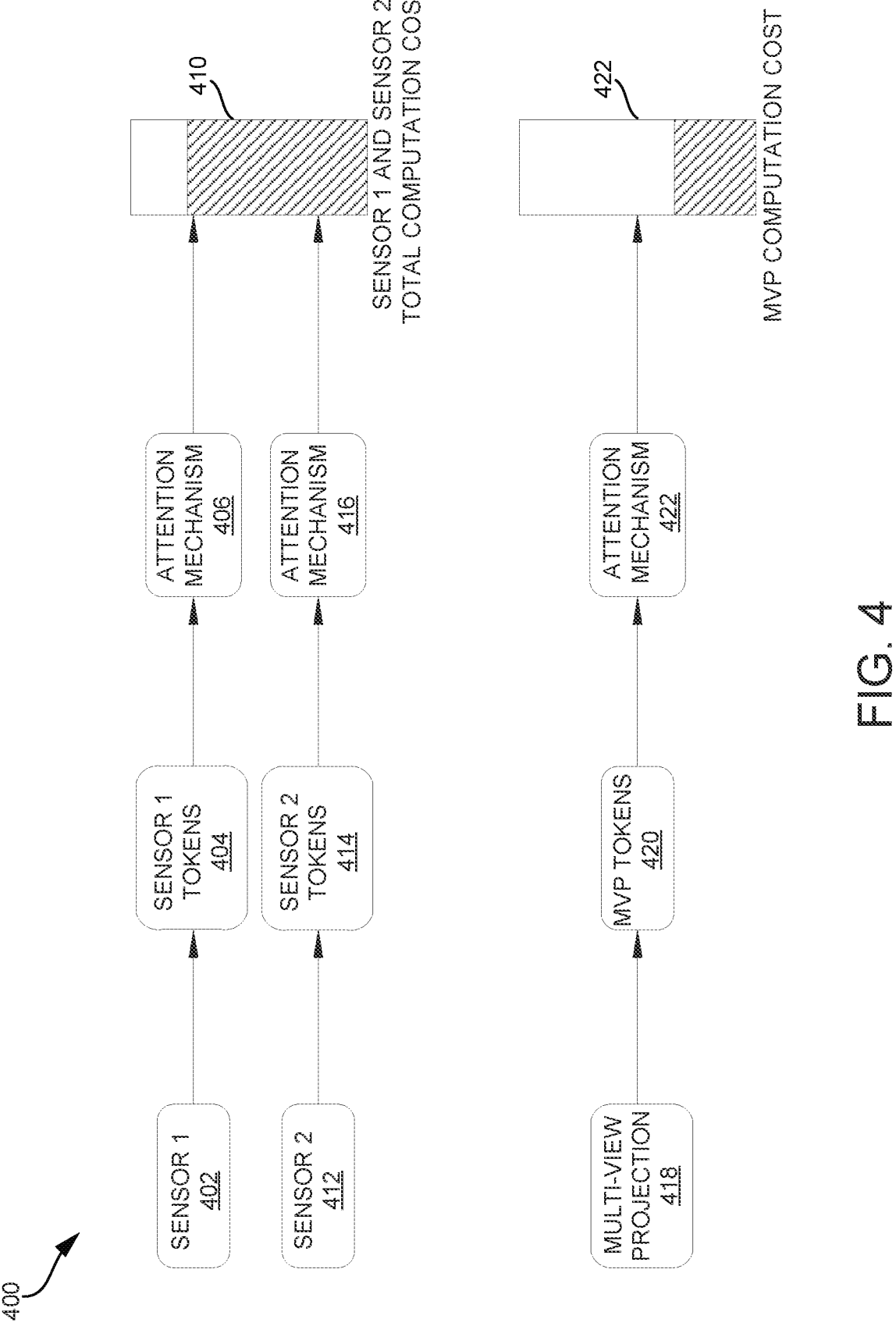
FIG. 4 illustrates an example system for determining computational resources for tokens generated based on sensor data, according to some examples of the present disclosure.

FIG. 4 illustrates an example comparison of computational resources used to process tokens representing sensor data, according to some examples of the present disclosure. In this example, attention mechanisms 406, 416, and 422 may be associated with the same attention-based neural network or separate attention-based neural networks. In some examples, the tokens 404 associated with sensor 402 may be processed by attention mechanism 406, and the tokens 414 associated with sensor 412 may be processed by attention mechanism 416.

The total computation cost 410 for tokens 404 and 414 may be determined by processing (e.g., via a neural network with an attention mechanism) tokens 404 and tokens 414 separately. For example, sensor 402 may be a camera sensor that captures visual data of an environment and the tokens 404 associated with sensor 402 may include a representation of the visual data. In this example, tokens 404 may represent a portion of an image frame that includes values for pixels in a portion of the image frame associated with an object and/or region of space. In another example, sensor 412 may be a LiDAR sensor that captures a three-dimensional map (e.g., a point cloud) of its surroundings. In this example, tokens 414 may include a representation of data from the three-dimensional map (e.g., location, distance, and/or intensity values) corresponding to the object and/or region of space. In some cases, the tokens 414 may also represent data corresponding to the reflectivity of an object captured by sensor 412.

In some examples, if sensor 402 is a camera sensor, the data associated with sensor 402 can include an image depicting a portion of a scene. The tokens 404 may be generated by projecting data from sensor 402 into a region of space. In some aspects, the tokens 404 may be generated by applying a network to extract features from the image. In some cases, each location in a feature map may encoded and/or represented in the data of the token 404. In some cases, tokens 404 may represent a portion of image data and visual features within that portion of image data. In some examples, if sensor 412 is a LiDAR sensor, the data associated with sensor 412 can include a point cloud representing a region of the environment. By way of example, tokens 414 may be generated by projecting one or more portions of the point cloud into the region of space. The point cloud (e.g., generated by sensor 412) can be converted into a structure such as a data cluster or a voxel grid, where datapoint in the data cluster or each voxel (e.g., three-dimensional volume) may include data about the points (e.g., from the point cloud) within the data cluster or voxel including, but not limited to, position, distance, and/or intensity information. In some aspects, each of the tokens 414 may be associated with a voxel containing data about a portion of the three-dimensional space and the LiDAR points within that portion.

The multi-view projection 418 may be the fusion or integration of projected data from sensor 402 and sensor 412. For example, the data of multi-view projection 418 may include a projected representation of the data from sensor 402 and the data from sensor 412. The MVP tokens 420 derived from multi-view projection 418 may be processed by attention mechanism 422 of a neural network. In some cases, as illustrated in FIG. 4, the MVP computation cost 422 from processing MVP tokens 420 may be less than the total computation cost 410 for processing tokens 404 and 414. The reduction in computational resources as illustrated by the MVP computation cost 422 (e.g., compared to the total computation cost 410) may be a result of reducing redundancy between data from sensor 402 and data from sensor 412, which may decrease the number of tokens (e.g., the number of MVP tokens 420 is less than the sum of tokens 404 and tokens 414), which may lead to less memory usage and processing time (e.g., by a transformer or other neural network with an attention mechanism).

Figure 5:
FIG. 5 illustrates an example process for processing multi-view projection tokens via an attention-based neural network, according to some examples of the present disclosure.
Figure 5:
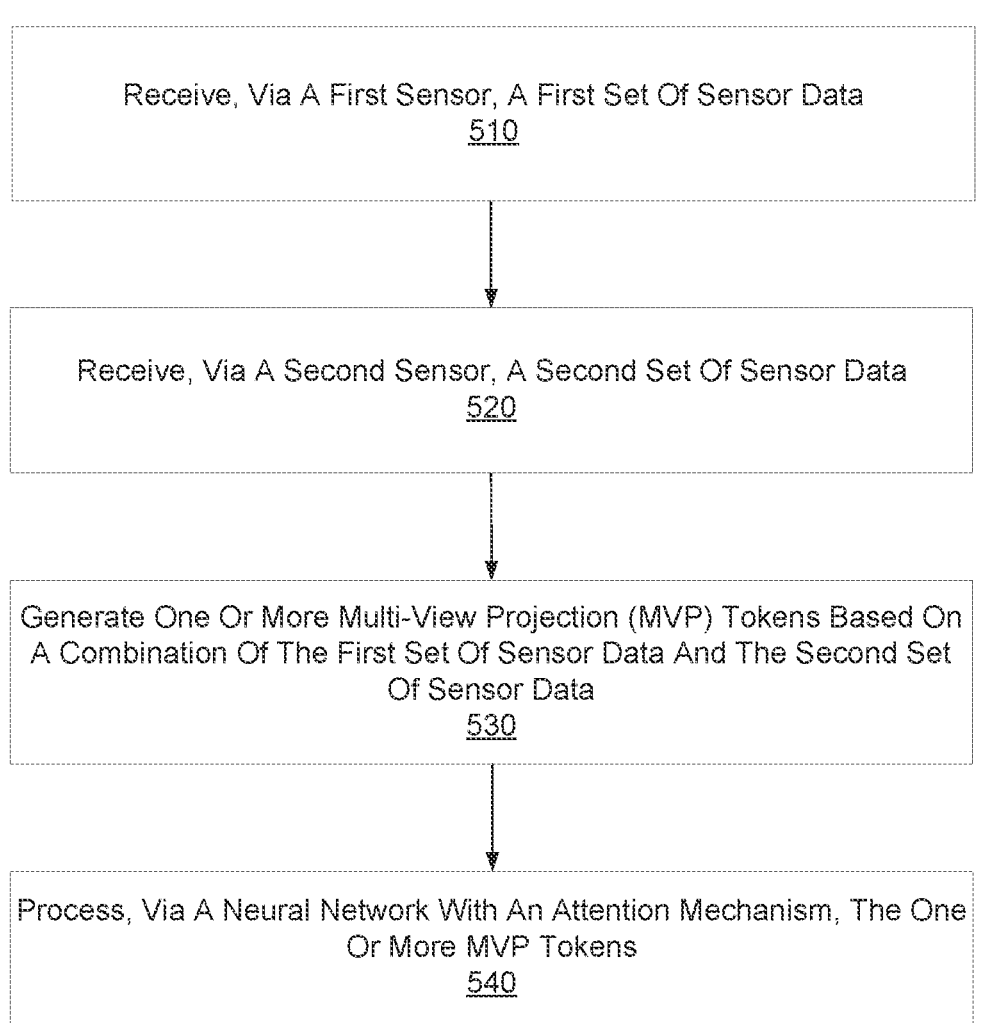

FIG. 5 illustrates an example process 500 for processing multi-view projection tokens using an attention-based neural network, according to some examples of the present disclosure. At block 510, the process 500 can include receiving, via a first sensor, a first set of sensor data. The first set of sensor data can represent an environment. For example, a first sensor (e.g., sensor system 104, sensor system 106, sensor system 108) may receive sensor data, such as image data, corresponding to an environment (e.g., where an AV is autonomously navigating).

At block 520, the process 500 can include receiving, via a second sensor, a second set of sensor data. The second set of sensor data can also represent the environment. For example, a second sensor (e.g., sensor system 104, sensor system 106, sensor system 108) may receive sensor data corresponding to the environment, such as point cloud data. In some examples, the point cloud data may include spatial information (e.g., x, y, z coordinates in three-dimensional space) associated with the environment. In some cases, each point in the point cloud may include an intensity value which may represent one or more properties of a surface in the environment, such as reflectivity and/or texture.

At block 530, the process 500 can include generating one or more multi-view projection (MVP) tokens based on a combination of the first set of sensor data and the second set of sensor data. In some examples, each MVP token of the one or more MVP tokens can include a representation of the first set of sensor data projected into space and/or the second set of sensor data projected into space.

In some aspects, generating the one or more MVP tokens can include projecting data from the first set of sensor data (e.g., image data) into 3D space and projecting data from the second set of sensor data (e.g., point cloud data from a LiDAR sensor) into the 3D space. The projected data from the first set of sensor data and the second set of sensor data can be fused to generate combined data projected into the 3D space. The combined data projected into the 3D space can be tokenized into one or more multi-view projection (MVP) tokens. In some cases, the sensor data can be preprocessed, for example, by normalizing the sensor data, removing outliers, or performing other operations.

In some examples, generating the one or more MVP tokens can include projecting a portion of the first set of sensor data into one or more regions of space in the environment to yield first projected data; projecting a portion of the second set of sensor data into one or more regions of space in the environment to yield second projected data; and generating the one or more MVP tokens based on a representation of the first projected data and the second projected data. In some cases, projecting a portion of the first set of sensor data into one or more regions of space in the environment can include excluding data from an additional portion of the first set of sensor data and data from an additional portion of the second set of sensor data from the one or more MVP tokens.

At block 540, the process 500 can include processing, via a neural network with an attention mechanism, the one or more MVP tokens. In some aspects, processing the one or more MVP tokens can include processing, via the neural network, the one or more MVP tokens using sliding window attention.

In some cases, the one or more MVP tokens can encode data representing a combination of at least a portion of the first set of sensor data and at least a portion of the second set of sensor data projected into a same region of space in the environment. In some examples, the first sensor can include a camera sensor, a light detection and ranging sensor, a radar detection and ranging sensor, or a time-of-flight sensor.

In some cases, the neural network with the attention mechanism may include, but are not limited to, a transformer, RNN, CNN, GNN, or LSTM. In some examples, process 500 can include generating a first set of tokens based on the first set of sensor data and a second set of tokens based on the second set of sensor data. For example, a first set of sensor data may be LiDAR point cloud data which may be tokenized, and the second set of sensor data may be image data which may also be tokenized. In some examples, process 500 can include steps for processing, via the neural network with the attention mechanism, the first set of tokens and the second set of tokens and determining a first computation cost associated with processing the first set of tokens and the second set of tokens, wherein the first set of tokens and the second set of tokens are processed separately by the neural network with the attention mechanism. For example, the computation cost (the amount of computational resources utilized such as processing time, memory usage, energy consumption) associated with the first set of tokens and the second set of tokens may be determined by the quantity of tokens in the first set of tokens and in the second set of tokens. In some cases, the computation cost may be the combined computation cost of processing both the first set of tokens and the second set of tokens.

Figure 6:
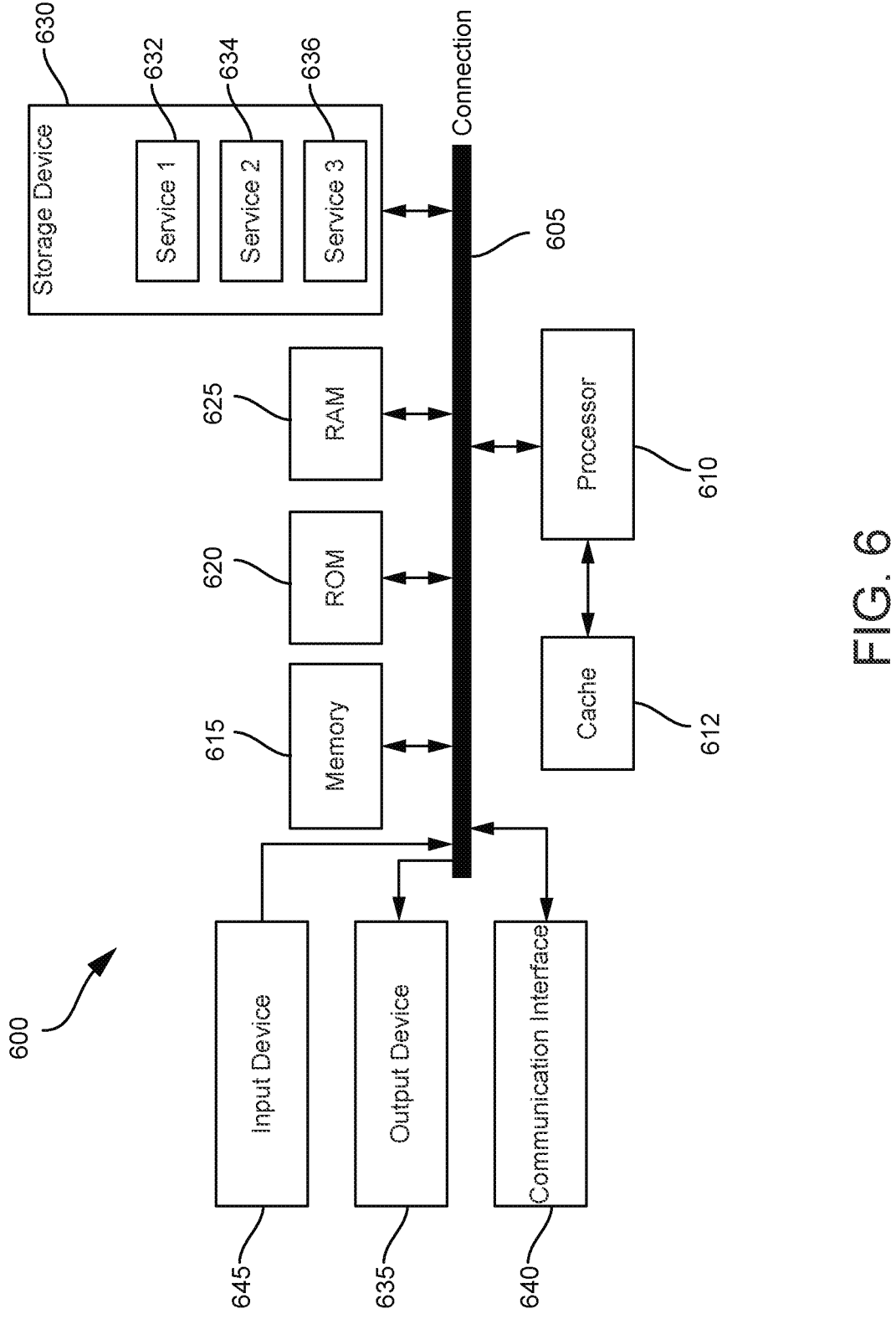
FIG. 6 illustrates an example processor-based system with which some aspects of the subject technology can be implemented, according to some aspects of the present disclosure.

FIG. 6 illustrates an example processor-based system with which some aspects of the subject technology can be implemented. For example, processor-based system 600 can be any computing device making up the local computing device 110 of the AV 102 illustrated in FIG. 1, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/ plug, a microphone jack/plug, a Universal Serial Bus (USB) port/plug, an Apple® Lightning® port/plug, an Ethernet port/plug, a fiber optic port/plug, a proprietary wired port/ plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the example aspects and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: at least one memory; and at least one processor coupled to the at least one memory, the at least one processor configured to: receive, via a first sensor, a first set of sensor data, wherein the first set of sensor data represents an environment; receive, via a second sensor, a second set of sensor data, wherein the second set of sensor data represents the environment; generate one or more multi-view projection (MVP) tokens based on a combination of the first set of sensor data and the second set of sensor data, wherein each MVP token of the one or more MVP tokens comprises a representation of at least one of the first set of sensor data projected into space and the second set of sensor data projected into space; and process, via a neural network with an attention mechanism, the one or more MVP tokens.

Aspect 2. The system of Aspect 1, wherein the first set of sensor data comprises point cloud data and the second set of sensor data comprises image data, and wherein the first set of sensor data and the second set of sensor data represent one or more objects in the environment.

Aspect 3. The system of any of Aspects 1 to 2, wherein generating the one or more MVP tokens comprises: projecting a portion of the first set of sensor data into one or more regions of space in the environment to yield first projected data; projecting a portion of the second set of sensor data into one or more regions of space in the environment to yield second projected data; and generating the one or more MVP tokens based on a representation of the first projected data and the second projected data.

Aspect 4. The system of Aspect 3, wherein projecting a portion of the first set of sensor data into one or more regions of space in the environment comprises excluding data from an additional portion of the first set of sensor data and data from an additional portion of the second set of sensor data from the one or more MVP tokens.

Aspect 5. The system of any of Aspects 1 to 4, wherein processing the one or more MVP tokens comprises processing, via the neural network, the one or more MVP tokens using sliding window attention.

Aspect 6. The system of any of Aspects 1 to 5, wherein the one or more MVP tokens encodes data representing a combination of at least a portion of the first set of sensor data and at least a portion of the second set of sensor data projected into a same region of space in the environment, and wherein the first sensor comprises a camera sensor, a light detection and ranging sensor, a radar detection and ranging sensor, or a time-of-flight sensor.

Aspect 7. The system of any of Aspects 1 to 6, wherein the neural network comprises a transformer.

Aspect 8. A computer-implemented method comprising: receiving, via a first sensor, a first set of sensor data, wherein the first set of sensor data represents an environment; receiving, via a second sensor, a second set of sensor data, wherein the second set of sensor data represents the environment; generating one or more multi-view projection (MVP) tokens based on a combination of the first set of sensor data and the second set of sensor data, wherein each MVP token of the one or more MVP tokens comprises a representation of at least one of the first set of sensor data projected into space and the second set of sensor data projected into space; and processing, via a neural network with an attention mechanism, the one or more MVP tokens.

Aspect 9. The computer-implemented method of Aspect 8, wherein the first set of sensor data comprises point cloud data and the second set of sensor data comprises image data, and wherein the first set of sensor data and the second set of sensor data represent one or more objects in the environment.

Aspect 10. The computer-implemented method of any of Aspects 8 to 9, wherein generating the one or more MVP tokens comprises: projecting a portion of the first set of sensor data into one or more regions of space in the environment to yield first projected data; projecting a portion of the second set of sensor data into one or more regions of space in the environment to yield second projected data;

and generating the one or more MVP tokens based on a representation of the first projected data and the second projected data.

Aspect 11. The computer-implemented method of Aspect 10, wherein projecting a portion of the first set of sensor data into one or more regions of space in the environment comprises excluding data from an additional portion of the first set of sensor data and data from an additional portion of the second set of sensor data from the one or more MVP tokens.

Aspect 12. The computer-implemented method of any of Aspects 8 to 11, wherein processing the one or more MVP tokens comprises processing, via the neural network, the one or more MVP tokens using sliding window attention.

Aspect 13. The computer-implemented method of any of Aspects 8 to 12, wherein the one or more MVP tokens encodes data representing a combination of at least a portion of the first set of sensor data and at least a portion of the second set of sensor data projected into a same region of space in the environment, and wherein the first sensor comprises a camera sensor, a light detection and ranging sensor, a radar detection and ranging sensor, or a time-of-flight sensor.

Aspect 14. The computer-implemented method of any of Aspects 8 to 13, wherein the neural network comprises a transformer.

Aspect 15. A non-transitory computer-readable storage medium comprising instructions that, when executed by one or more processors, cause the one or more processors to perform a method according to any of Aspects 8 to 14.

Aspect 16. A system comprising means for performing a method according to any of Aspects 8 to 14.

Aspect 17. A computer-program product containing instructions which, when executed by one or more processors, cause the one or more processors to perform a method according to any of Aspects 8 to 14.

What is claimed is:

1. A system comprising:
at least one memory; and
at least one processor coupled to the at least one memory, the at least one processor configured to:
  receive, via a first sensor, a first set of sensor data, wherein the first set of sensor data represents an environment;
  receive, via a second sensor, a second set of sensor data, wherein the second set of sensor data represents the environment;
  generate one or more multi-view projection (MVP) tokens based on a combination of the first set of sensor data and the second set of sensor data, wherein each MVP token of the one or more MVP tokens comprises a representation of at least one of the first set of sensor data projected into space and the second set of sensor data projected into space; and
  process, via a neural network with an attention mechanism, the one or more MVP tokens, wherein the attention mechanism determines an importance or relevance of the one or more MVP tokens.

2. The system of claim 1, wherein the first set of sensor data comprises point cloud data and the second set of sensor data comprises image data, and wherein the first set of sensor data and the second set of sensor data represent one or more objects in the environment.

3. The system of claim 1, wherein generating the one or more MVP tokens comprises:

projecting a portion of the first set of sensor data into one or more regions of space in the environment to yield first projected data;
projecting a portion of the second set of sensor data into one or more regions of space in the environment to yield second projected data; and
generating the one or more MVP tokens based on a representation of the first projected data and the second projected data.

4. The system of claim 3, wherein projecting a portion of the first set of sensor data into one or more regions of space in the environment comprises excluding data from an additional portion of the first set of sensor data and data from an additional portion of the second set of sensor data from the one or more MVP tokens.

5. The system of claim 1, wherein processing the one or more MVP tokens comprises processing, via the neural network, the one or more MVP tokens using sliding window attention.

6. The system of claim 1, wherein the one or more MVP tokens encodes data representing a combination of at least a portion of the first set of sensor data and at least a portion of the second set of sensor data projected into a same region of space in the environment, and wherein the first sensor comprises a camera sensor, a light detection and ranging sensor, a radar detection and ranging sensor, or a time-of-flight sensor.

7. The system of claim 1, wherein the neural network comprises a transformer.

8. A computer-implemented method comprising:
receiving, via a first sensor, a first set of sensor data, wherein the first set of sensor data represents an environment;
receiving, via a second sensor, a second set of sensor data, wherein the second set of sensor data represents the environment;
generating one or more multi-view projection (MVP) tokens based on a combination of the first set of sensor data and the second set of sensor data, wherein each MVP token of the one or more MVP tokens comprises a representation of at least one of the first set of sensor data projected into space and the second set of sensor data projected into space; and
processing, via a neural network with an attention mechanism, the one or more MVP tokens, wherein the attention mechanism determines an importance or relevance of the one or more MVP tokens.

9. The computer-implemented method of claim 8, wherein the first set of sensor data comprises point cloud data and the second set of sensor data comprises image data, and wherein the first set of sensor data and the second set of sensor data represent one or more objects in the environment.

10. The computer-implemented method of claim 8, wherein generating the one or more MVP tokens comprises:
projecting a portion of the first set of sensor data into one or more regions of space in the environment to yield first projected data;
projecting a portion of the second set of sensor data into one or more regions of space in the environment to yield second projected data; and
generating the one or more MVP tokens based on a representation of the first projected data and the second projected data.

11. The computer-implemented method of claim 10, wherein projecting a portion of the first set of sensor data into one or more regions of space in the environment comprises excluding data from an additional portion of the first set of sensor data and data from an additional portion of the second set of sensor data from the one or more MVP tokens.

12. The computer-implemented method of claim 8, wherein processing the one or more MVP tokens comprises processing, via the neural network, the one or more MVP tokens using sliding window attention.

13. The computer-implemented method of claim 8, wherein the one or more MVP tokens encodes data representing a combination of at least a portion of the first set of sensor data and at least a portion of the second set of sensor data projected into a same region of space in the environment, and wherein the first sensor comprises a camera sensor, a light detection and ranging sensor, a radar detection and ranging sensor, or a time-of-flight sensor.

14. The computer-implemented method of claim 8, wherein the neural network comprises a transformer.

15. A non-transitory computer-readable storage medium comprising instructions that, when executed by one or more processors, cause the one or more processors to:

receive, via a first sensor, a first set of sensor data, wherein the first set of sensor data represents an environment;

receive, via a second sensor, a second set of sensor data, wherein the second set of sensor data represents the environment;

generate one or more multi-view projection (MVP) tokens based on a combination of the first set of sensor data and the second set of sensor data, wherein each MVP token of the one or more MVP tokens comprises a representation of at least one of the first set of sensor data projected into space and the second set of sensor data projected into space; and process, via a neural network with an attention mechanism, the one or more MVP tokens, wherein the attention mechanism determines an importance or relevance of the one or more MVP tokens subsequent to the generation of the one or more MVP tokens.

16. The non-transitory computer-readable storage medium of claim 15, wherein the first set of sensor data comprises point cloud data and the second set of sensor data comprises image data, and wherein the first set of sensor data and the second set of sensor data represent one or more objects in the environment.

17. The non-transitory computer-readable storage medium of claim 15, wherein generating the one or more MVP tokens comprises:

projecting a portion of the first set of sensor data into one or more regions of space in the environment to yield first projected data;

projecting a portion of the second set of sensor data into one or more regions of space in the environment to yield second projected data; and generating the one or more MVP tokens based on a representation of the first projected data and the second projected data.

18. The non-transitory computer-readable storage medium of claim 17, wherein projecting a portion of the first set of sensor data into one or more regions of space in the environment comprises excluding data from an additional portion of the first set of sensor data and data from an additional portion of the second set of sensor data from the one or more MVP tokens.

19. The non-transitory computer-readable storage medium of claim 15, wherein processing the one or more MVP tokens comprises processing, via the neural network, the one or more MVP tokens using sliding window attention.

20. The non-transitory computer-readable storage medium of claim 15, wherein the neural network comprises a transformer.

\* \* \* \* \*